United States Patent
Pick (10) Patent No.: US 11,872,991 B2
(45) Date of Patent: Jan. 16, 2024

(54) SEQUENTIAL TRANSMISSION SHIFT SYSTEM

(71) Applicant: Dean Pick, Vancouver (CA)

(72) Inventor: Dean Pick, Vancouver (CA)

( * ) Notice: Subject to any disclaimer, the term of this patent is extended or adjusted under 35 U.S.C. 154(b) by 0 days.

(21) Appl. No.: 17/737,556

(22) Filed: May 5, 2022

(65) Prior Publication Data
US 2023/0356718 A1 Nov. 9, 2023

(51) Int. Cl.
*B60W 10/11* (2012.01)
*B60W 30/19* (2012.01)
(Continued)

(52) U.S. Cl.
CPC ........... *B60W 30/19* (2013.01); *B60W 10/02* (2013.01); *B60W 10/06* (2013.01); *B60W 10/11* (2013.01); *F16H 59/40* (2013.01); *F16H 59/42* (2013.01); *F16H 61/12* (2013.01); *F16H 61/32* (2013.01); *F16H 63/304* (2013.01); *F16H 63/50* (2013.01); *B60W 2510/0208* (2013.01); *B60W 2510/104* (2013.01); *B60W 2510/1005* (2013.01); *B60W 2510/1015* (2013.01); *B60W 2710/021* (2013.01); *B60W 2710/0644* (2013.01); *B60W 2710/0666* (2013.01); *B60W 2710/1005* (2013.01); *B60W 2720/10* (2013.01); *F16H 2061/1256* (2013.01); *F16H 2061/2869* (2013.01); *F16H 2063/3056* (2013.01)

(58) Field of Classification Search
CPC .......... F16H 59/40; F16H 59/42; F16H 61/12; F16H 61/32; F16H 63/304; F16H 63/50; F16H 2061/1256; F16H 2061/2869; F16H 2063/3056; F16H 2061/124; F16H 2059/6807; F16H 2059/6823; F16H 2061/047; B60W 30/19; B60W 30/1006; B60W 10/11; B60W 2510/1005; B60W 2510/101; B60W 2510/1015; B60W 2510/104; B60W 2710/0644; B60W 2710/0666; B60W 2710/1005; B60W 2720/10
USPC ......................... 74/337, 337.5; 477/115, 116
See application file for complete search history.

(56) References Cited

U.S. PATENT DOCUMENTS

5,542,309 A * 8/1996 Wenger ................... F16H 63/18
74/357
7,963,183 B2 6/2011 Pick et al.
(Continued)

*Primary Examiner* — Roger L Pang
(74) *Attorney, Agent, or Firm* — Kagan Binder, PLLC (57) ABSTRACT

A transmission control apparatus for controlling a vehicle's transmission. The apparatus includes (i) a control motor mechanically connected to the transmission's selector drum and is actuable to rotate the selector drum, (ii) a torque sensor which senses torque applied to the selector drum by the control motor, (iii) a controller configured to control the control motor based on signals received from the torque sensor to control the engagement/disengagement of the dog clutches; and (iv) a cam indexer connected to the selector drum. The cam indexer includes (i) a cam sprocket having one gear detent corresponding to each of gear engagement position of the selector drum, and one neutral detent corresponding to each neutral position of the selector drum, and (ii) a cam follower that engages with the gear detents and biases the selector drum into either a corresponding gear engagement position or a corresponding neutral position.

16 Claims, 4 Drawing Sheets

(51) Int. Cl.
*F16H 63/30* (2006.01)
*F16H 63/50* (2006.01)
*F16H 59/42* (2006.01)
*F16H 59/40* (2006.01)
*B60W 10/06* (2006.01)
*B60W 10/02* (2006.01)
*F16H 61/12* (2010.01)
*F16H 61/32* (2006.01)
*F16H 61/28* (2006.01)

(56) References Cited

U.S. PATENT DOCUMENTS

| | | | | |
|---|---|---|---|---|
| 8,251,869 | B2 * | 8/2012 | Mizutani | F02D 31/001 |
| | | | | 477/110 |
| 8,276,472 | B2 * | 10/2012 | Sotani | F16H 63/18 |
| | | | | 74/337.5 |
| 10,316,934 | B2 * | 6/2019 | Takahashi | F16H 3/30 |
| 2005/0151492 | A1 * | 7/2005 | Nakai | H02P 25/08 |
| | | | | 318/432 |

* cited by examiner

SEQUENTIAL TRANSMISSION SHIFT SYSTEM

FIELD OF THE INVENTION

The present invention relates generally to an apparatus and system for controlling a sequential transmission using a control motor and sensors to shift gears, and more particularly to such an apparatus configured having a cam indexer connected to the selector drum of the transmission.

BACKGROUND OF THE INVENTION

There has been rising consumer demand for affordable automated manual transmissions (AMT) for motor vehicles.

There has further been rising consumer demand for electric vehicles that feature good acceleration and driving range.

Implementing an AMT solution on a vehicle equipped with an internal combustion engine typically involves control of a friction clutch mechanism to smooth torque transfer between the engine and transmission after a gear change operation and to prevent engine stall when the vehicle comes to rest.

Installing a multi-gear transmission on an electric vehicle typically requires installation of a friction clutch mechanism to smooth torque transfer between the engine and transmission after a gear change operation. A friction clutch mechanism, which adds weight and cost to the vehicle, is typically not otherwise required on an electric vehicle.

In the aforementioned arrangements the automated control of a friction clutch mechanism requires at least one clutch controller, which adds weight and cost to the vehicle. The clutch controller requires power to operate and introduces time delay during a gear shift operation as clutch disengagement and engagement operations take time to complete.

A transmission is used to transmit power from an engine to a drive mechanism. The transmission uses the principle of mechanical advantage to convert the rotational speed, direction, and torque of a driving element into a different rotational speed, direction, and torque of a driven element. Most transmissions use a combination of gears in differing ratios to achieve this speed-torque conversion.

Vehicle transmissions often include more than one set of gear ratios (typically called "gears", such as "first gear", "second gear", etc.) to allow the vehicle to operate in a variety of conditions. When the vehicle is at rest or travelling at a low speed, a gear ratio may be selected to deliver relatively high torque from the engine to the driveline. When the vehicle is travelling at higher speeds, a different ratio may be used to deliver higher rotational speeds at lower torque to the driveline. The gear ratio may be selected to optimize the delivery of power to the driveline having regard to the characteristics of the engine, and, in particular, to the engine's delivery of power as a function of the engine's rotational speed. Changing the gear ratio of a transmission is commonly known as shifting or changing gears, and typically requires a brief decoupling of the engine from the driveline using a clutch arrangement.

Figure 1:
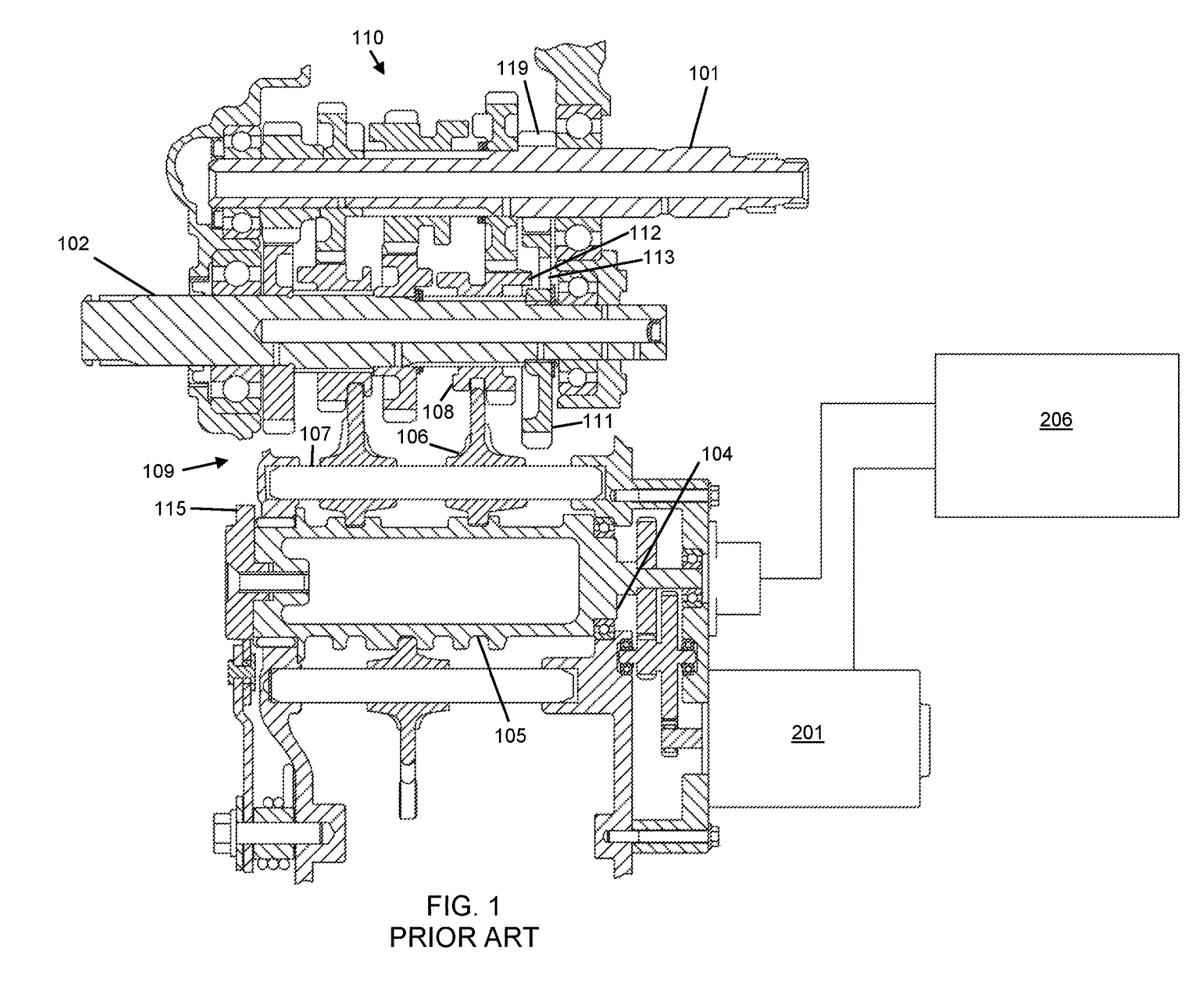
FIG. 1 is a top sectional view of a prior art sequential transmission for a motorcycle.

A typical vehicle transmission as exemplified in FIG. 1 may include an input shaft 101 which is driven by the engine through a clutching arrangement, and an output shaft 102 which may drive the driveline when a gear is selected. The input shaft 101 typically passes through a number of input gears 110. The output shaft 102 in this arrangement may pass through a number of corresponding output gears 109 which mesh with the input gears 110, each pair of meshed gears being a gear set. In each gear set, one of the gears is not directly affixed to the input or output shaft, and may spin independently of the shaft when not engaged, and the other is affixed to the input or output shaft. Adjacent to each free spinning gear 111, a sliding gear 108 may be mounted on the shaft passing through that free spinning gear 111. Each sliding gear 108 may slide along the length of the shaft, but otherwise engage the shaft so that it rotates along with the shaft. Each free spinning gear 111 may have dog teeth which engage with the adjacent sliding gear 108 when the sliding gear 108 is slid along the shaft. The sliding gear 108 engages and rotates the free spinning gear 111 with the corresponding shaft, thereby selecting a gear. Once engaged, the output shaft 102 is driven by the input shaft 101 in a ratio determined by the selected gear set.

Although this is a common implementation of a vehicle transmission, there are many variations which achieve the same function in a similar manner.

Some vehicles use a sequential transmission, which is a transmission having at least two sets of gears which must be selected in a predetermined order during shifting. If a vehicle has three gears, the sequential transmission cannot be shifted from any one gear set to any other gear set. It must be shifted in an order which is determined by the configuration of the gear changing mechanism.

In a sequential transmission implemented on the typical vehicle transmission described above as exemplified in FIG. 1, the sliding gears 108 are moved by selector forks 106 that slidably engage a selector fork shaft 107 which is aligned parallel to a selector drum 104. Typically, there are grooves 105, wedges or ridges on a selector drum 104 which engage the selector forks 106 and convert the rotation of the selector drum 104 into lateral movement of the selector forks 106 along the selector fork shaft 107 in a direction parallel to the input shaft 101 and output shaft 102, thereby moving the sliding gears 108 along the input shaft 101 or output shaft 102. The use of a selector drum 104 to select gears in this arrangement forces the operator to shift gears in order. Gear dog teeth 112 located on the side of sliding gears 108 are used to engage gear dog windows 113 located on the common side of the free spinning gear 111. This engagement effectively locks the free spinning gear 111 to the shaft running through its hub and permits torque to be transmitted from the input shaft 101 to the output shaft 102 through the free spinning gear 111 and its meshing gear 119. The combination of a sliding gear with gear dog teeth and gear dog windows on a free spinning gear that are engageable with the gear dog teeth may be referred to as a dog clutch.

Sequential transmissions are preferred in certain applications over other types of transmissions because of the relative simplicity of the apparatus. A typical sequential transmission has fewer moving parts and is generally more reliable than a comparable fully manual non-sequential transmission. They can often be made smaller and lighter than other comparable designs, and can be faster to complete gear shifts. They are often employed in automotive racing and motorcycle applications for these reasons.

Many sequential transmissions are driven manually by the operator using hand or foot levers that may rotate the selector drum 104 through a ratcheting arrangement. This allows the operator to rotate the selector drum 104 enough to cause the shift, but helps prevent the operator from rotating the selector shaft too far. When implemented on a motorcycle, the sequential transmission may include an indexer arrangement, such as a cam indexer 116. The indexing arrangement may include a cam sprocket 115 connected to the selector drum 104 in combination with a pawl or cam follower 118 that engages depressions, or detents, in the cam sprocket 115 as the selector drum 104 is rotated. The cam follower 118 may have a wheel at one end which may roll along the cam sprocket 115, and may be biased so that the wheel maintains contact with the cam sprocket 115. When the cam follower is seated in a depression, the selector drum 104 has been rotated to a position where a gear is engaged. By applying force to a shift lever attached to the ratcheting arrangement, the operator may rotate the selector drum 104 if the force is sufficient to unseat the cam follower from the depression and overcome friction forces. As the selector drum 104 rotates, the cam follower will move into an adjacent depression on the cam sprocket 115.

Figure 3A:
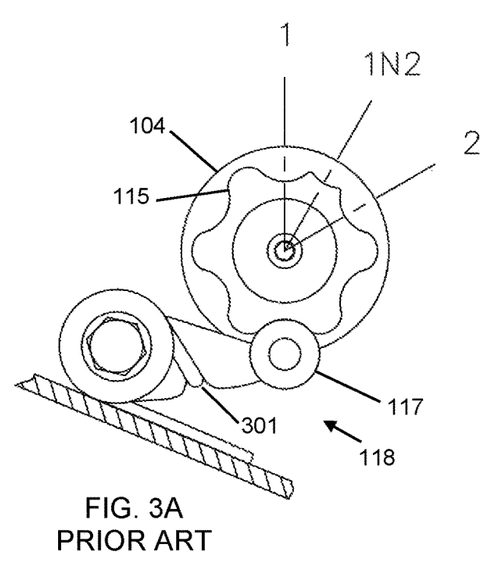
FIG. 3A is a side view of a prior art indexing means in a settled position.
Figure 3B:
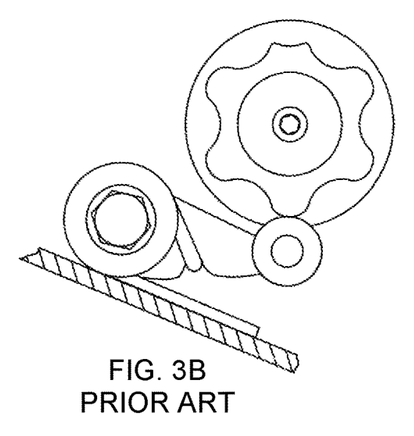
FIG. 3B is a side view of a prior art indexing means in a neutral position.

FIGS. 3A and 3B depict a mechanical biasing means comprising a cam sprocket 115 having a series of indentations and a cam follower 118 hinged at one end and having a wheel or cam follower 117 at the other end and a spring 301 for biasing the cam follower 118 against the cam sprocket 115. When in gear, the cam follower 118 will settle into one of the indentations. As previously mentioned, a control system can detect if it has driven the selector drum 104 into a position where the cam follower 118 is not quite settled into one of the impressions because the selector drum 104 will experience torque caused by the biased cam follower 118 against the surface of the cam sprocket 115 to settle it into position. This permits the system to continually calibrate itself relative to the mechanical environment, which is necessary because the system may over time become imprecise as wear and sensor degradation occurs.

Automatic and Semiautomatic Configurations

Any sequential transmission systems known in the art may be operated by automatic or semi-automatic control means. These automatic or semi-automatic controllers typically include an electrical or electronic control system that may be programmable, and a control mechanism which may include buttons, levers or switches that may be operated by the vehicle operator. In a fully automatic configuration, the shifting of the transmission is performed entirely by the controller in response to external conditions, engine speed, current gear in which the transmission is operating and other factors such as whether the operator is braking or accelerating. Such an automatic transmission will shift up and down through the gears as the operator attempts to accelerate or decelerate the vehicle.

There are a number of transmission systems for sequential controllers that include a control motor or other drive means directly connected to the selector drum allowing the controller to drive the selector shaft and thereby shift the transmission from one gear set to another gear set in response to its programming. Many configurations for such control motor driven sequential transmissions have been disclosed in the prior art. Some describe a motor coupled to a sequential transmission using a set of gears to increase the electrical motor torque and reduce the speed. Some prior art configurations show a selector shaft gear system being implemented as a worm gear arrangement.

Semi-automatic and automatic transmission systems may use one or more sensors in order to determine the status of the transmission, such as what gear it is in, the position of the control motor and/or the position of the selector drum. The control system for such systems initiates a shift or prevents a shift from occurring under certain circumstances in response to the sensory inputs. For example, a control system could be aware of the current gear of the transmission and how far and how long it needs to operate the control motor to shift the system into an adjacent gear.

One problem with such systems is that the system must be calibrated when assembled to pre-select the particular positions for each gear relative to the motor. Once the pre-selected gear positions are programmed into the system, the system will typically drive the control motor to the pre-selected gear position. This can pose difficulties in operation because the transmission wears over time and may expand or contract as a result of external temperature changes, and so the exact position to shift the transmission into an adjacent gear may change over time and with such external conditions.

The cam follower mechanism is primarily used to hold the transmission in an engaged gear or neutral state. The mechanism typically works by generating a counteracting torque when rotated away from the bias position. A secondary benefit is that it can accommodate variances in shift position due to wear and temperature changes.

Commonly known as gear jam, a problem occurs when the leading edge of a gear dog belonging to a sliding gear is brought against the leading edge of the gear dog window belonging to the corresponding free spinning gear. Under these conditions the gears may not fully engage or may resist engaging and the shift attempt will fail. Many modern transmissions incorporate a synchronizer mechanism, commonly known as a synchromesh device, to enable gear engagement, however these devices add to the size, weight, and cost of the transmission. In the absence of a synchromesh device, if the control system does not sense such interference conditions, it will continue to drive the motor generating excessive strain on the elements of the system. Under those circumstances the transmission, the control motor, or both may be damaged. Since a shift of a sequential transmission may occur in a short period of time (e.g. less than one hundredth of a second), any control system would have to be equipped with sensors that detect interference conditions quickly and accurately.

A sequential transmission shift system is described in U.S. Pat. No. 7,963,183, which is hereby incorporated herein by reference in its entirety. The primary inventive feature of this patent is the inclusion of a torque sensor which senses the torque applied to the selector drum by the control motor, and a controller for controlling the control motor based on signals received from the torque sensor to thereby control the engagement of a set of gears.

SUMMARY OF THE INVENTION

The present invention provides a transmission control apparatus for controlling a transmission of a vehicle. The vehicle, such as a motorcycle or an automobile, has an engine in mechanical communication with the transmission. The transmission includes an input shaft, an output shaft, at least two dog clutches, at least two sets of gears which are selectively engageable, and a selector drum. When the selector drum is rotated into a selected gear engagement position corresponding to a selected gear set, it causes one of the dog clutches to engage with the selected gear set. This causes the selected gear set to engage, causing power to be transmitted from the engine to drive the output shaft from the input shaft. The selector drum has a neutral position between each pair of adjacent gear engagement positions.

The transmission control apparatus includes a control motor, a torque sensor, a controller, and a cam indexer. The control motor is mechanically connected to the selector drum and can be actuated by the controller to rotate the selector drum. The torque sensor senses torque applied to the selector drum by the control motor. The controller is configured to control the control motor based on signals received from the torque sensor to control the engagement and disengagement of the dog clutches. The cam indexer is connected to the selector drum. The cam indexer includes a cam sprocket and a cam follower. The cam sprocket has one gear detent corresponding to each of the gear engagement positions of the selector drum, and one neutral detent corresponding to each of the neutral positions of the selector drum. The cam follower engages with the gear detents and biases the selector drum into either a corresponding gear engagement position or a corresponding neutral position.

The neutral detents are preferably shallower than the gear detents.

The transmission control apparatus may also include a selector drum position sensor, and the controller may be further configured to detect excessive dog clutch stiction when (a) based on information provided by the selector drum position sensor, the selector drum is determined to be in a gear engagement position where a selected dog clutch is engaged, and (b) the torque applied to the selector drum by the control motor to disengage the selected dog clutch exceeds a predetermined value as determined from information provided by the torque sensor.

The transmission control apparatus may be further configured to take countermeasures when excessive dog clutch stiction is detected.

The countermeasures may include stopping the control motor, reducing the control motor's output, or reversing the control motor, or combinations thereof.

The countermeasures may be combined with engine control techniques that vary the output of the engine to reduce torque transfer through the selected dog clutch.

The transmission control apparatus may further include a selector drum position sensor, an input shaft angular speed sensor that senses the angular speed of the input shaft of the transmission, and an output shaft angular speed sensor that senses the angular speed of the output shaft of the transmission. The controller may be further configured to detect excessive relative angular speed of a disengaged dog clutch when (a) based on information provided by the selector drum position sensor, the selector drum is determined to be in one of the neutral positions, and (b) the relative angular speed of the disengaged dog clutch exceeds an upper predetermined value as determined from information provided by the angular speed sensors.

When the controller detects excessive relative angular speed the controller may take countermeasures. The countermeasures may include increasing the engine speed, reducing the engine speed, or reducing the vehicle speed.

The controller may be further configured to determine when the relative angular speed is less than a lower predetermined amount, as determined from information provided by the angular speed sensors, indicating the absence of excessive relative angular speed of the disengaged dog clutch, and when the relative angular speed is determined to be less than the predetermined amount, the controller causes the control motor to engage the disengaged dog clutch.

DETAILED DESCRIPTION OF THE INVENTION

The present invention improves and enhances the system disclosed in U.S. Pat. No. 7,963,183 ("U.S. Pat. No. 7,963,183").

U.S. Pat. No. 7,963,183 solves the problem of using a torque sensor and controller to quickly detect gear jams and accurately react to permit gear engagement without risking damage to the engine. Other problems related to changing gears in the absence of clutch control or, more generally, mechanical decoupling between engine and transmission remain unresolved.

Problem #1: Excessive Dog Clutch Stiction

U.S. Pat. No. 7,963,183 does not address using the torque sensor and controller to quickly detect excessive dog clutch stiction and accurately react to permit gear disengagement.

Figure 5A:
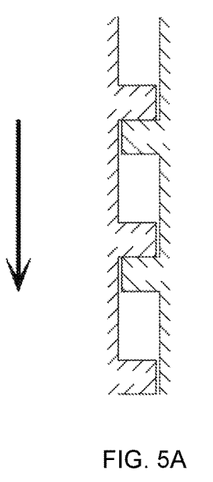
FIG. 5A depicts gear dogs in an engaged state.
Figure 5B:
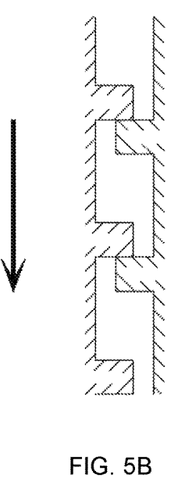
FIG. 5B depicts gear dogs in a partially engaged state.
Figure 5C:
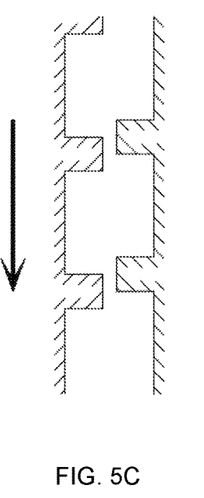
FIG. 5C depicts gear dogs in a disengaged state.

Dog clutch stiction occurs when torque is being transmitted through an engaged pair of dog clutches. FIG. 5A depicts gear dogs in an engaged state. Dog clutches transfer torque through a plurality of dogs that engage each other at mating surfaces that are oriented orthogonal, or nearly orthogonal, to the direction of travel. Torque transfer through the dog clutch is seen as thrust forces at the mating surfaces. In order to disengage an engaged gear pair, the control motor must develop torque that produces an axial thrust at the engaged dogs that is greater than the engaged friction force. FIG. 5C depicts gear dogs in a disengaged state.

Having the control motor generate high torque to overcome dog clutch stiction is generally not favourable as this can increase the stress applied to mechanical components, such as the selector fork.

In order to reduce shift times and minimize vehicle weight there is a desire to keep components lightweight. The preferred means to overcome excessive dog clutch stiction is to momentarily reduce torque transfer through the dog clutch. This can be achieved by varying the power produced by the engine.

Figure 2:
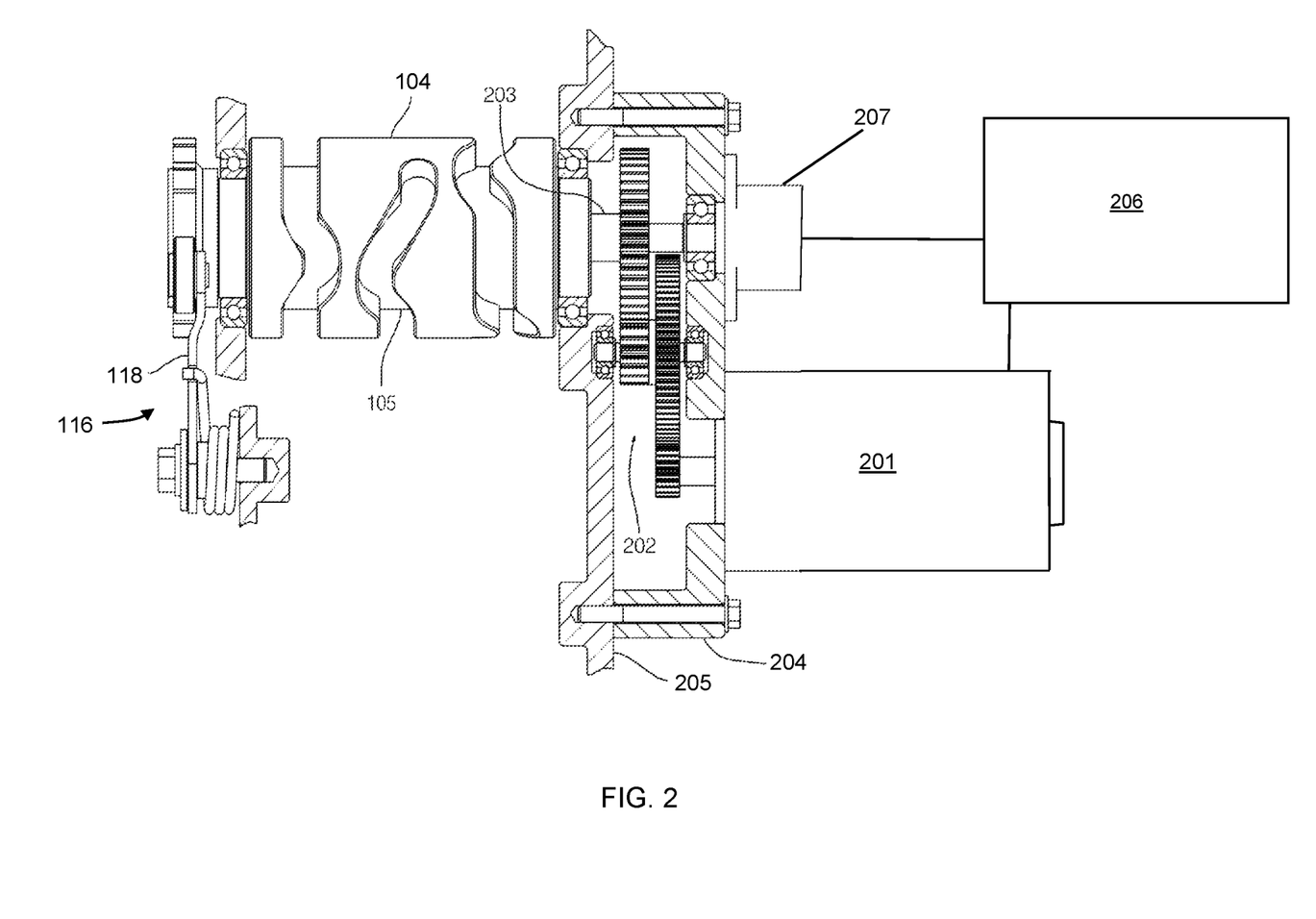
FIG. 2 is a top view of an embodiment of the invention depicting a control motor driving the selector drum through a geartrain.

Due to challenges in directly measuring torque transfer through a transmission it is convenient for the controller to estimate this torque transfer value from available sensor information. Sensor information can be combined with look-up tables stored in read-only memory (ROM), for example, and software algorithms to predetermine an appropriate variation in engine output to reduce the torque transfer to an acceptable level. To reduce shift times there is a desire to minimize the duration of engine output variation. This can lead to conditions where the torque transfer through the engaged dog clutch has not been sufficiently reduced at the moment where the control motor attempts to disengage the dog clutch. While this dog clutch stiction can be detected by a lack of gear drum movement via the gear position sensor 207 this requires taking the derivative of the position signal to solve for angular velocity. General lack of accurate and precise gear position sensor readings necessitates that the controller to take several sensor samples over a time span that introduces delay in detecting dog clutch stiction. A solution for quickly determining this condition is required.

Problem #2: High Relative Angular Velocity of a Dog Clutch

U.S. Pat. No. 7,963,183 does not address the condition when a dog clutch pair moving at a high angular velocity relative to each other are brought into engagement.

In the absence of a disengaged friction clutch, the engagement of a dog clutch pair moving at a high angular velocity relative to each other can introduce shock loading on the transmission. This shock load can be considerable in magnitude as the rotational inertia of the engine components on one side of the engaged dog clutch are brought into synchronous speed with the rotational inertia of the drivetrain components and the inertia of the vehicle and payload. Shock loads can cause undesirable acceleration of the vehicle and impart high stresses on engine and transmission components.

The preferred means to reduce shock loads during dog clutch engagement is to vary the engine speed in order to reduce the relative angular velocity between the two halves of an engaging dog clutch. For example, during an upshift event where the transmission is shifted from a larger reduction ratio to a lower reduction ratio the relative angular velocity between the two halves of an engaging dog clutch can be reduced by reducing the power output of the engine such that its absolute speed reduces at a rate faster than the absolute speed of the vehicle reduces in the presence of normal friction forces.

For such a strategy to work the engine must be mechanically disengaged from the vehicle. In the absence of a disengaged friction clutch a method of achieving this state is through disengagement of the previously engaged dog clutch.

U.S. Pat. No. 7,963,183 discloses a cam indexer having a series of impressions therein that biases the selector drum into a fixed number of gear positions using a biased pawl. On a typical sequential transmission, the cam indexer tends to bias the selector drum into multiple engaged gear states and one neutral state. While the cam indexer is useful for locating and holding the transmission in a fixed gear it generates torques that are counterproductive to the controller's attempts to use the control motor to maintain the transmission in a neutral gear position when the engine speed is being varied for the purposes of reducing the relative angular velocity between the two halves of an engaging dog clutch. A cam indexer that does not bias the selector drum away from neutral positions between engaged gears is required.

A control motor that operates on the gear drum via a ratcheting mechanism is undesirable. The use of a ratcheting mechanism is not ideal because it is a poor mechanical transmitter of reverse torque, and therefore may not provide good feedback to a control motor torque sensor. Additionally, the ratcheting mechanism is typically only able to rotate through a fixed rotation angle. This fixed rotation angle could be set to the angle of rotation between an engaged gear and a neutral position or between two fixed gear positions. While the use of a fixed rotation angle equal to the angle of rotation between an engaged gear and a neutral position would permit shifting into and out of a neutral position it adds additional time and delay to gear shift operations that seek to shift between engaged gear positions as quickly as possible. While the use of a fixed rotation angle equal to the angle of rotation between two fixed gear positions would permit faster gear shifts, it complicates the process of shifting from an engaged gear to a neutral position as the ratcheting mechanism is not utilized and would interfere with the aforementioned feedback from a control motor torque sensor. A solution for quickly and accurately shifting from both a fixed gear position to a neutral position and between fixed gear positions is required.

Solution

The invention uses the torque sensor and controller to quickly detect excessive dog clutch stiction and accurately react to permit gear disengagement without risking damage to the engine. When the control motor encounters a dog clutch stiction event it quickly develops torque that approaches its stall torque capacity. The control can monitor for this condition by determining when the selector drum is in a position where a dog clutch is engaged.

The system may detect whether the selector drum is in a position where a dog clutch is engaged by using a position sensor. The position sensor may be coupled directly to the selector drum, or may be integrated into the control motor. In the latter case, the position of the selector drum may be inferred from the number of revolutions that the control motor has made since the shift started. The system may also deem the selector drum to be in a dog clutch stiction zone after a predetermined delay from the initiation of the shift.

Excessive dog clutch stiction can be inferred by the controller when the selector drum is in a position where a dog clutch is engaged (as in FIG. 5A, including a partially engaged state, such as that shown in FIG. 5B), the control motor is being driven, and the torque applied to the selector drum by the control motor exceeds a predetermined value. In this case the controller is able to sense the torque applied to the selector drum by the control motor via a torque sensor.

Once the controller has detected a dog clutch stiction condition indicating excessive stiction, it may take appropriate countermeasures. Countermeasures may include stopping the control motor, reducing the control motors output, or reversing the control motor. These countermeasures can be combined with engine control techniques that vary the engines output to reduce torque transfer through the engaged dog clutch. For example, when driving forward the torque transfer through the engaged dog clutch can be reduced by momentarily reducing the power output of the engine.

Once the control motor rotates the selector drum past the dog clutch stiction zone the control can either bring the selector drum to a neutral gear position or attempt to engage the subsequent gear.

Figure 4:
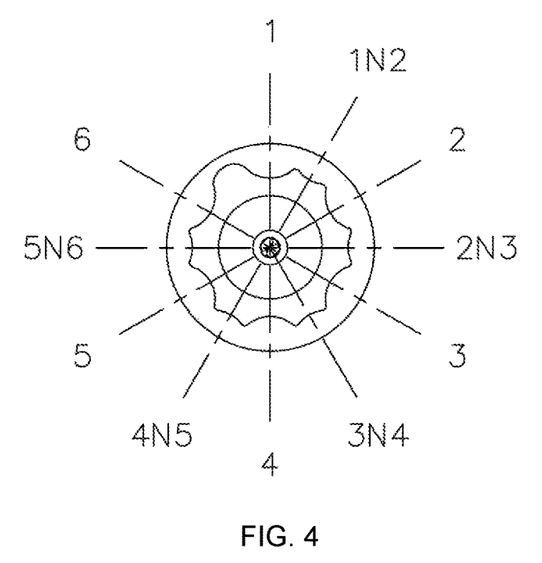
FIG. 4 is a side view of a star cam indexer according to the present invention having six fixed gear position detents, each corresponding to a gear engagement position of the selector drum, and six neutral detents, each between a pair of adjacent gear detents, each neutral detent corresponding to a neutral position of the selector drum.

When the subsequent dog clutch pair is moving at a high angular velocity relative to each other it may be desirous for the selector drum to arrive at, and hold, a neutral gear position while the relative angular velocity is reduced through engine control. A cam indexer design that locates neutral position detent features between fixed gear positions enables the control motor to arrive at, and hold, the neutral position. FIG. 4 is a side view of a star cam indexer having six fixed gear position detents 1, 2, 3, 4, 5 and 6, each corresponding to a gear engagement position of the selector drum, and five neutral detents 1N2, 2N3, 3N4, 4N5, and 5N6, each between a pair of adjacent gear detents, each neutral detent corresponding to a neutral position of the selector drum. The number of gear and neutral detents may of course be different. For example, there may be three, four, five, seven, eight or more. It is preferred that each of the neutral detents be shallower than the gear detents, which may facilitate more efficient gear shifting.

The controller can detect the neutral state of the transmission through evaluation of the selector drum position. Alternatively, a dedicated neutral position sensor, or switch, can be used to increase the confidence level that the neutral state has been achieved. Once detected the controller can take measures to reduce the relative angular velocity between engaging dog clutch halves. For example, during an upshift event where the transmission is shifted from a larger reduction ratio to a lower reduction ratio the relative angular velocity between the two halves of an engaging dog clutch can be reduced by reducing the power output of the engine such that its absolute speed reduces at a rate faster than the absolute speed of the vehicle reduces in the presence of normal friction forces. This relative angular velocity can be monitored through comparison of the engine speed to the driven wheel speed while factoring in the engaging gear ratio. Once the relative angular velocity between engaging dog clutch halves is sufficiently reduced the controller can stop the relative angular velocity control measures and attempt to engage the engaging dog clutch. While a method to engage the engaging dog clutch is described in U.S. Pat. No. 7,963,183, a situation can occur when the relative angular velocity of the engage dog clutch approaches zero such that a jam condition exists and does not change with time. This undesirable scenario can be avoided by maintaining some relative angular velocity between engaging dog clutch halves.

The described approach is suitable for clutchless shifting on internal combustion engines and electric drive trains. It removes the requirement for a clutch controller on vehicles equipped with an internal combustion engine. It also removes the requirement for a clutch on vehicles equipped with an electric engine. It reduces shift shock by bringing the transmission closer to a state of synchronicity prior to gear engagement. The invention also provides a safe operating condition for engine power control to be utilized to bring the transmission closer to a state of synchronicity, in which a set of gears is engaged or meshed. Finally, the invention provides a method for quickly determining a dog clutch stiction condition exists.

In the absence of a ratcheting mechanism the controller must control the control motor such that the selector drum comes to a rest at the target angular position. The control motor can be braked, at a target position or on its approach to a target position, by electrically connecting its poles together. The control motor can also be decelerated by applying a magnetic field that generates torque in the opposite direction of the turning control motor. In the event of target overshoot, the control motor can be stopped and reversed towards the target position.

Sensors, such as an inertial measurement unit, may be used to improve situational awareness that can improve the estimation of torque transfer through the transmission. An estimation for the engine torque can be provided by the engine controller via an analog signal or serial communication means.

The cam indexer may incorporate mechanical locating features that key into the selector drum to prevent installation at an incorrect angle.

There are multiple ways to reduce the relative angular velocity between engaging dog clutch halves, including varying engine output via throttle plate angle, fueling, ignition advance, and vehicle brake controllers.

FIG. 2 shows one embodiment of the invention comprising a control motor 201 driving the selector drum 104. A cam indexer 116 having a series of impressions therein biases the selector drum 104 into a fixed number of gear positions using a biased pawl 118. The control motor 201 may drive the selector shaft 203 through a series of selector shaft gears 202. The control motor 201 may incorporate a position sensor, such as a Hall effect sensor, to determine the position of the control motor 201.

The selector shaft gears 202 may include spur gears, bevel gears, helical gears and hypoid gears. In a preferred embodiment the selector shaft gears 202 would not include a worm drive arrangement, as worm gear arrangements are typically poor mechanical transmitters of reverse torque, and therefore may not provide good feedback to a torque sensor. Worm gears are helical gears having a helix angle that does not exceed 50 degrees.

The invention may also comprise a position sensor 206, 207 in addition to or instead of the position sensor in the control motor 201, which may incorporate a Hall effect sensor or other current sensing means that encompasses or encircles or is immediately adjacent to the selector shaft 203 or selector drum 104. The position sensor 206 may be used to detect the position of the selector shaft 203 relative to a fixed point such as the motor mounting 204 or relative to the housing of the transmission 205. The position sensor 206 may operate by use of a potentiometer, in which case the selector shaft 203 rotates relative to the potentiometer changing the current flow through the potentiometer. In the case of a Hall effect sensor, the selector shaft 203 may have mounted upon it permanent magnets or may comprise a portion which has been magnetized so that it generates a magnetic field which is detected by the Hall effect sensor. Changes in the magnetic field may be outputted by the Hall effect sensor as a digital signal or as an analog voltage.

When the position sensing means are used in conjunction with mechanical biasing means of the system, it is possible for the system to adapt over time to account for wear, and also to adapt on the fly to address transient dangerous gear jam conditions. In an embodiment which includes a biasing means for mechanically biasing the selector drum 104 into one of a number of gear positions, when the controller has actuated the control motor 201 and driven the selector drum 104 into one of those desired positions, as perceived by the controller in accordance with a set of pre-programmed control positions, the control motor 201 has completed its actuation into the next shift position. If the pre-programmed control position is out of calibration, the cam indexer 116 will apply a correcting torque to the selector drum 104 bringing it to the mechanically correct position. By monitoring the position of the selector drum 104 via the position sensor 206 the controller can detect when the pre-programmed control positions have fallen out of calibration. The control system can therefore alter the stored motor control positions to approach the settled values of the mechanical system. It may accomplish this by calculating the difference between the motor position coordinates following a gear change and the stored motor position coordinates corresponding with that gear, and modifies the stored motor position coordinates if the difference is greater than a predefined threshold.

In operation, the control motor 201 drives the selector shaft gears 202 which in turn drive the selector shaft 203 to one of the pre-programmed positions, overcoming the resistance of friction and the indexer biasing means to shift the system into an adjacent gear.

The transmission control apparatus may include a selector drum position sensor that senses the position of the selector drum, an input shaft angular speed sensor that senses the angular speed of the input shaft, and an output shaft angular speed sensor that senses the angular speed of the output shaft. The controller may be configured to detect excessive relative angular speed of a disengaged dog clutch when (a) based on information provided by the selector drum position sensor, the selector drum is determined to be in one of the neutral positions, and (b) the relative angular speed of the disengaged dog clutch exceeds an upper predetermined value as determined from information provided by the angular speed sensors.

When the controller detects excessive relative angular speed the controller preferably takes countermeasures such as increasing the engine speed, reducing the engine speed, or reducing the vehicle speed.

If the relative angular speed is less than a lower predetermined amount, as determined from information provided by the angular speed sensors, indicating the absence of excessive relative angular speed of the disengaged dog clutch, and the relative angular speed is determined to be less than the predetermined amount, the controller may cause the control motor to engage the disengaged dog clutch.

Generally, a computer, computer system, computing device, controller, client or server, as will be well understood by a person skilled in the art, includes one or more than one electronic computer processor, and may include separate memory, and one or more input and/or output (I/O) devices (or peripherals) that are in electronic communication with the one or more processor(s). The electronic communication may be facilitated by, for example, one or more busses, or other wired or wireless connections. In the case of multiple processors, the processors may be tightly coupled, e.g. by high-speed busses, or loosely coupled, e.g. by being connected by a wide-area network.

A computer processor, or just "processor", is a hardware device for performing digital computations. It is the express intent of the inventor that a "processor" does not include a human; rather it is limited to be an electronic device, or devices, that perform digital computations. A programmable processor is adapted to execute software, which is typically stored in a computer-readable memory. Processors are generally semiconductor based microprocessors, in the form of microchips or chip sets. Processors may alternatively be completely implemented in hardware, with hard-wired functionality, or in a hybrid device, such as field-programmable gate arrays or programmable logic arrays. Processors may be general-purpose or special-purpose off-the-shelf commercial products, or customized application-specific integrated circuits (ASICs). Unless otherwise stated, or required in the context, any reference to software running on a programmable processor shall be understood to include purpose-built hardware that implements all the stated software functions completely in hardware.

Multiple computers (also referred to as computer systems, computing devices, clients and servers) may be networked via a computer network, which may also be referred to as an electronic network or an electronic communications network. When they are relatively close together the network may be a local area network (LAN), for example, using Ethernet. When they are remotely located, the network may be a wide area network (WAN), such as the internet, that computers may connect to via a modem, or they may connect to through a LAN that they are directly connected to.

Computer-readable memory, which may also be referred to as a computer-readable medium or a computer-readable storage medium, which terms have identical (equivalent) meanings herein, can include any one or a combination of non-transitory, tangible memory elements, such as random access memory (RAM), which may be DRAM, SRAM, SDRAM, etc., and nonvolatile memory elements, such as a ROM, PROM, FPROM, OTP NVM, EPROM, EEPROM, hard disk drive, solid state disk, magnetic tape, CDROM, DVD, etc.) Memory may employ electronic, magnetic, optical, and/or other technologies, but excludes transitory propagating signals so that all references to computer-readable memory exclude transitory propagating signals. Memory may be distributed such that at least two components are remote from one another, but are still all accessible by one or more processors. A nonvolatile computer-readable memory refers to a computer-readable memory (and equivalent terms) that can retain information stored in the memory when it is not powered. A computer-readable memory is a physical, tangible object that is a composition of matter. The storage of data, which may be computer instructions, or software, in a computer-readable memory physically transforms that computer-readable memory by physically modifying it to store the data or software that can later be read and used to cause a processor to perform the functions specified by the software or to otherwise make the data available for use by the processor. In the case of software, the executable instructions are thereby tangibly embodied on the computer-readable memory. It is the express intent of the inventor that in any claim to a computer-readable memory, the computer-readable memory, being a physical object that has been transformed to record the elements recited as being stored thereon, is an essential element of the claim.

Software may include one or more separate computer programs configured to provide a sequence, or a plurality of sequences, of instructions to one or more processors to cause the processors to perform computations, control other devices, receive input, send output, etc.

It is intended that the invention includes computer-readable memory containing any or all of the software described herein. In particular, the invention includes such software stored on non-volatile computer-readable memory that may be used to distribute or sell embodiments of the invention or parts thereof.

The abbreviation mm as used herein refers to millimetres (or in the US, "millimeters"). The abbreviation cm as used herein refers to centimetres (or in the US, "centimeters").

Where, in this document, a list of one or more items is prefaced by the expression "such as" or "including", is followed by the abbreviation "etc.", or is prefaced or followed by the expression "for example", or "e.g.", this is done to expressly convey and emphasize that the list is not exhaustive, irrespective of the length of the list. The absence of such an expression, or another similar expression, is in no way intended to imply that a list is exhaustive. Unless otherwise expressly stated or clearly implied, such lists shall be read to include all comparable or equivalent variations of the listed item(s), and alternatives to the item(s), in the list that a skilled person would understand would be suitable for the purpose that the one or more items are listed. Unless expressly stated or otherwise clearly implied herein, the conjunction "or" as used in the specification and claims shall be interpreted as a non-exclusive "or" so that "X or Y" is true when X is true, when Y is true, and when both X and Y are true, and "X or Y" is false only when both X and Y are both false.

The words "comprises" and "comprising", when used in this specification and the claims, are used to specify the presence of stated features, elements, integers, steps or components, and do not preclude, nor imply the necessity for, the presence or addition of one or more other features, elements, integers, steps, components or groups thereof.

It should be understood that the above-described embodiments of the present invention, particularly, any "preferred" embodiments, are only examples of implementations, merely set forth for a clear understanding of the principles of the invention. Many variations and modifications may be made to the above-described embodiment(s) of the invention as will be evident to those skilled in the art. That is, persons skilled in the art will appreciate and understand that such modifications and variations are, or will be, possible to utilize and carry out the teachings of the invention described herein.

The scope of the claims that follow is not limited by the embodiments set forth in the description. The claims should be given the broadest purposive construction consistent with the description and figures as a whole.

What is claimed is:

1. A transmission control apparatus for controlling a transmission of a vehicle, the vehicle having an engine in mechanical communication with the transmission, the transmission comprising:
    an input shaft;
    an output shaft;
    at least two dog clutches;
    at least two sets of gears which are selectively engageable; and
    a selector drum that when rotated into a selected one of a plurality of gear engagement positions corresponding to a selected gear set causes one of the dog clutches to engage with the selected gear set, causing the selected gear set to engage, causing power to be transmitted from the engine to drive the output shaft from the input shaft, the selector drum having a neutral position between each pair of adjacent gear engagement positions,
the transmission control apparatus comprising:
    a. a control motor which is mechanically connected to the selector drum and is actuable to rotate the selector drum;
    b. a torque sensor which senses torque applied to the selector drum by the control motor;
    c. a controller configured to control the control motor based on signals received from the torque sensor to thereby control the engagement and disengagement of the dog clutches;
    d. a cam indexer connected to the selector drum, the cam indexer comprising (i) a cam sprocket having one gear detent corresponding to each of the gear engagement positions of the selector drum, and one neutral detent corresponding to each of the neutral positions of the selector drum, and (ii) a cam follower that engages with the gear detents and biases the selector drum into either a corresponding gear engagement position or a corresponding neutral position;
    e. a selector drum position sensor;
    f. an input shaft angular speed sensor that senses the angular speed of the input shaft; and
    g. an output shaft angular speed sensor that senses the angular speed of the output shaft,
    wherein the controller is further configured to detect excessive relative angular speed of a disengaged dog clutch when (iii) based on information provided by the selector drum position sensor, the selector drum is determined to be in one of the neutral positions, and (iv) the relative angular speed of the disengaged dog clutch exceeds an upper predetermined value as determined from information provided by the angular speed sensors.

2. The transmission control apparatus of claim 1, wherein when the controller detects excessive relative angular speed the controller takes countermeasures.

3. The transmission control apparatus of claim 2, wherein the countermeasures comprise increasing the engine speed.

4. The transmission control apparatus of claim 3, wherein the controller is further configured to determine when the relative angular speed is less than a lower predetermined amount, as determined from information provided by the angular speed sensors, indicating the absence of excessive relative angular speed of the disengaged dog clutch, and when the relative angular speed is determined to be less than the predetermined amount, the controller causes the control motor to engage the disengaged dog clutch.

5. The transmission control apparatus of claim 2, wherein the countermeasures comprise reducing the engine speed.

6. The transmission control apparatus of claim 5, wherein the controller is further configured to determine when the relative angular speed is less than a lower predetermined amount, as determined from information provided by the angular speed sensors, indicating the absence of excessive relative angular speed of the disengaged dog clutch, and when the relative angular speed is determined to be less than the predetermined amount, the controller causes the control motor to engage the disengaged dog clutch.

7. The transmission control apparatus of claim 2, wherein the countermeasures comprise reducing the vehicle speed.

8. The transmission control apparatus of claim 7, wherein the controller is further configured to determine when the relative angular speed is less than a lower predetermined amount, as determined from information provided by the angular speed sensors, indicating the absence of excessive relative angular speed of the disengaged dog clutch, and when the relative angular speed is determined to be less than the predetermined amount, the controller causes the control motor to engage the disengaged dog clutch.

9. The transmission control apparatus of claim 1, wherein the controller is further configured to detect excessive dog clutch stiction when (a) based on information provided by the selector drum position sensor, the selector drum is determined to be in a gear engagement position where a selected dog clutch is engaged, and (b) the torque applied to the selector drum by the control motor to disengage the selected dog clutch exceeds a predetermined value as determined from information provided by the torque sensor.

10. The transmission control apparatus of claim 9, wherein when excessive dog clutch stiction is detected, the controller takes countermeasures.

11. The transmission control apparatus of claim 10, wherein the countermeasures comprise stopping the control motor.

12. The transmission control apparatus of claim 11, wherein the countermeasures are combined with engine control techniques that vary the output of the engine to reduce torque transfer through the selected dog clutch.

13. The transmission control apparatus of claim 10, wherein the countermeasures comprise reducing the control motor's output.

14. The transmission control apparatus of claim 13, wherein the countermeasures are combined with engine control techniques that vary the output of the engine to reduce torque transfer through the selected dog clutch.

15. The transmission control apparatus of claim 10, wherein the countermeasures comprise reversing the control motor.

16. The transmission control apparatus of claim 15, wherein the countermeasures are combined with engine control techniques that vary the output of the engine to reduce torque transfer through the selected dog clutch.

\* \* \* \* \*